(12) United States Patent
Roh (10) Patent No.: US 7,349,044 B2
(45) Date of Patent: Mar. 25, 2008

(54) LIQUID CRYSTAL DISPLAY ASSEMBLY HAVING THE INTERFERENCE FILTER DISPOSED CORRESPONDING EXCLUSIVELY TO THE GREEN REGION

(75) Inventor: Soo-Guy Roh, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/902,047

(22) Filed: Jul. 30, 2004

(65) Prior Publication Data
US 2005/0174512 A1    Aug. 11, 2005

(30) Foreign Application Priority Data
Aug. 4, 2003   (KR) ................. 2003-53734

(51) Int. Cl.
*G02F 1/1335* (2006.01)
(52) U.S. Cl. .............. 349/105; 349/104; 349/106
(58) Field of Classification Search ............. 349/105
See application file for complete search history.

(56) References Cited
U.S. PATENT DOCUMENTS 4,822,144 A * 4/1989 Vriens ................... 349/71
5,734,457 A * 3/1998 Mitsui et al. ............ 349/106
6,864,933 B2 * 3/2005 Broer et al. ............. 349/105

FOREIGN PATENT DOCUMENTS

JP    02149881 A  *  6/1990

OTHER PUBLICATIONS

Attached Abstract and drawings of JP 02-149881.*

* cited by examiner

*Primary Examiner*—David Nelms
*Assistant Examiner*—Lucy Chien
(74) *Attorney, Agent, or Firm*—F. Chau & Associates, LLC (57) ABSTRACT

An LCD assembly comprising a TFT substrate, and a color filter disposed above the TFT substrate and formed with red, green and blue regions, further comprises an interference filter disposed corresponding to the green region with respect to a direction of emitting light to the color filter, and having a allowable wavelength range allowing light having a wavelength range of a green color to be transmitted. With this configuration, the present invention provides an LCD assembly in which decrement of light-transmissivity is small, process stability is increased, and high chromaticity is realized.

7 Claims, 10 Drawing Sheets

○ EXISTING SPECTRUM OF GREEN COLOR

△ SPECTRUM OF GREEN COLOR WHEN PIGMENT-DISPERSED DENSITY IS INCREASED BY FOUR TIMES

LIQUID CRYSTAL DISPLAY ASSEMBLY HAVING THE INTERFERENCE FILTER DISPOSED CORRESPONDING EXCLUSIVELY TO THE GREEN REGION

CROSS-REFERENCE TO RELATED APPLICATIONS

This application claims the benefit of Korean Patent Application No. 2003-53734, filed Aug. 4, 2003, in the Korean Intellectual Property Office, the disclosure of which is incorporated herein by reference.

BACKGROUND OF THE INVENTION (a) Field of the Invention

The present invention relates to a liquid crystal display (LCD) assembly, and more particularly, to an LCD assembly that can display colors with high chromaticity.

(b) Description of the Related Art

Generally, an LCD assembly employing a thin film transistor (TFT) as a switching element can display colors by controlling the TFT and an liquid crystal cell to adjust transmissivity of light emitted from a backlight and by additively mixing three primary light colors transmitted through red, green and blue color filters.

Figure 1:
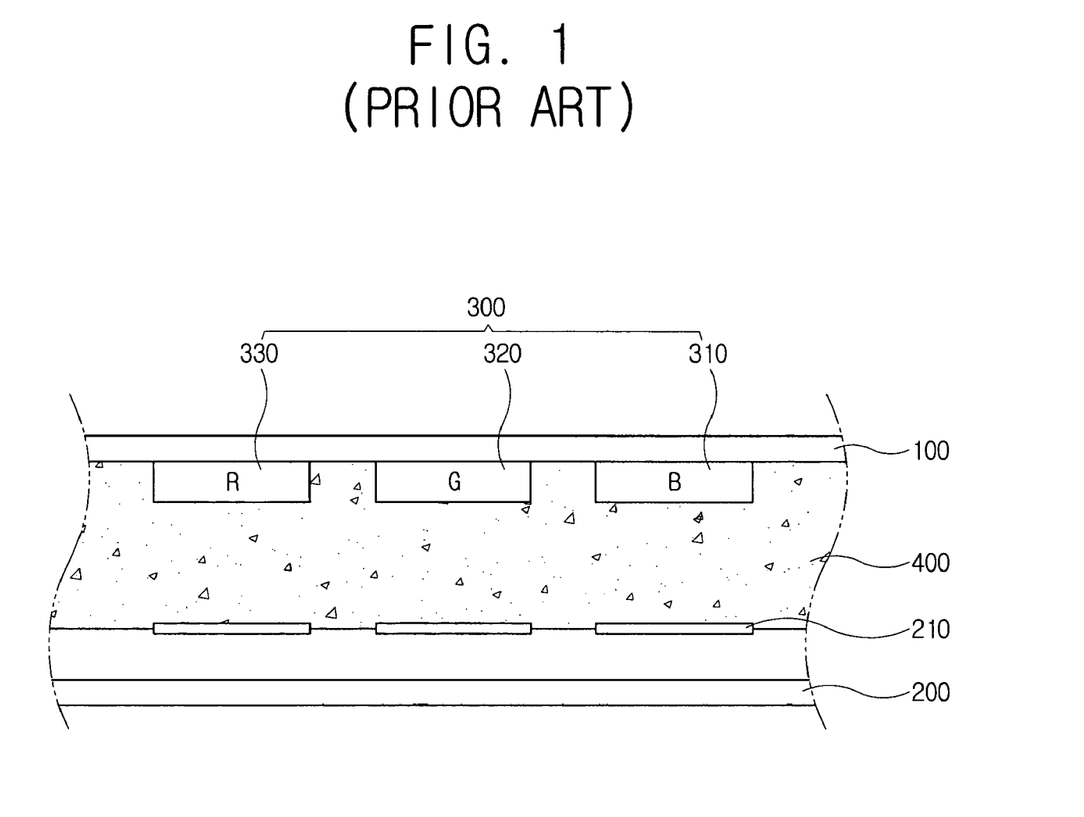
FIG. 1 is a sectional view of an LCD panel in a conventional LCD assembly.

FIG. 1 is a sectional view of an LCD panel in a conventional LCD assembly. An LCD panel comprises a TFT substrate 200 having TFTs corresponding to a plurality of pixels, a color filter substrate 100 having the color filters 300, and a liquid crystal 400 filled between the TFT substrate 200 and the color filter substrate 100. Here, each pixel of the TFT substrate 200 is provided with an indium tin oxide (ITO) 210 as an electrode.

The color filter 300 is provided in a flat matrix formed on the color filter substrate 100, including a red filter 330, a green filter 320 and a blue filter 310 with good light-transmissivity. Ways of arranging the color filter 300 are different according to the LCD assemblies, and includes a mosaic arrangement, a triangle arrangement, a straight line arrangement, etc. Here, the color filter 300 is required to have high chromatic density and high light-transmissivity, be not discolored by the backlight (not shown), be chemically stable, and do not interact with the liquid crystal 400.

Further, the color filter 300 is classified into a dying type and a pigment type according to materials of an organic filter, and is fabricated by a dying method, a dispersion method, an electrodepositing method, a printing method, etc. Currently, in the case of the LCD assembly using the TFT, the dispersion method is popular in making the color filter 300. Here, the color filter 300 fabricated by the dispersion method comprises photoresist elements for a photopolymerization such as a photopolymerization initiator, a monomer, a binder, etc., and organic pigments for the colors.

Here, to make a display unit get a larger size, be improved in property such as high fineness, etc., and maximize a color perception, a photolithography process is used when patterns of the red, green and blue color filters are formed. Particularly, the photolithography process is very important because the color filter 300 performs optical-filtering with a remaining color layer to maximize the chromatic cognition of the display unit.

As a process for forming the patterns, the photolithography process is divided into a photo process and an etching process. In fabricating the color filter 300, the photolithography process allows various materials coated on a wafer to form the color filter patterns. That is, a photoresist polymer is applied to a substrate and is then developed when exposed to light shining through a photomask, so that the photoresist polymer has a desired pattern. Thereafter, the substrate covered with the photoresist polymer having the desired pattern is etched, thereby forming the color filter pattern thereon.

Here, chromaticity property of the color filter 300 is realized by using a photopolymer and a color photoresist having dispersed pigments. In this case, high chromaticity and high brightness of the LCD assembly are realized by using a high transmissive pigment and increasing pigment-dispersed density.

However, as the pigment-dispersed density of the color photoresist is increased, the stability of the photoresist is decreased, the process of fabricating the color filter is complicated, and the film thickness of the color filter is increased. Therefore, a manufacturing process of the conventional LCD assembly is unstable and polarizability for light is lowered, thereby deteriorating the chromaticity property of the LCD assembly.

Figure 2:
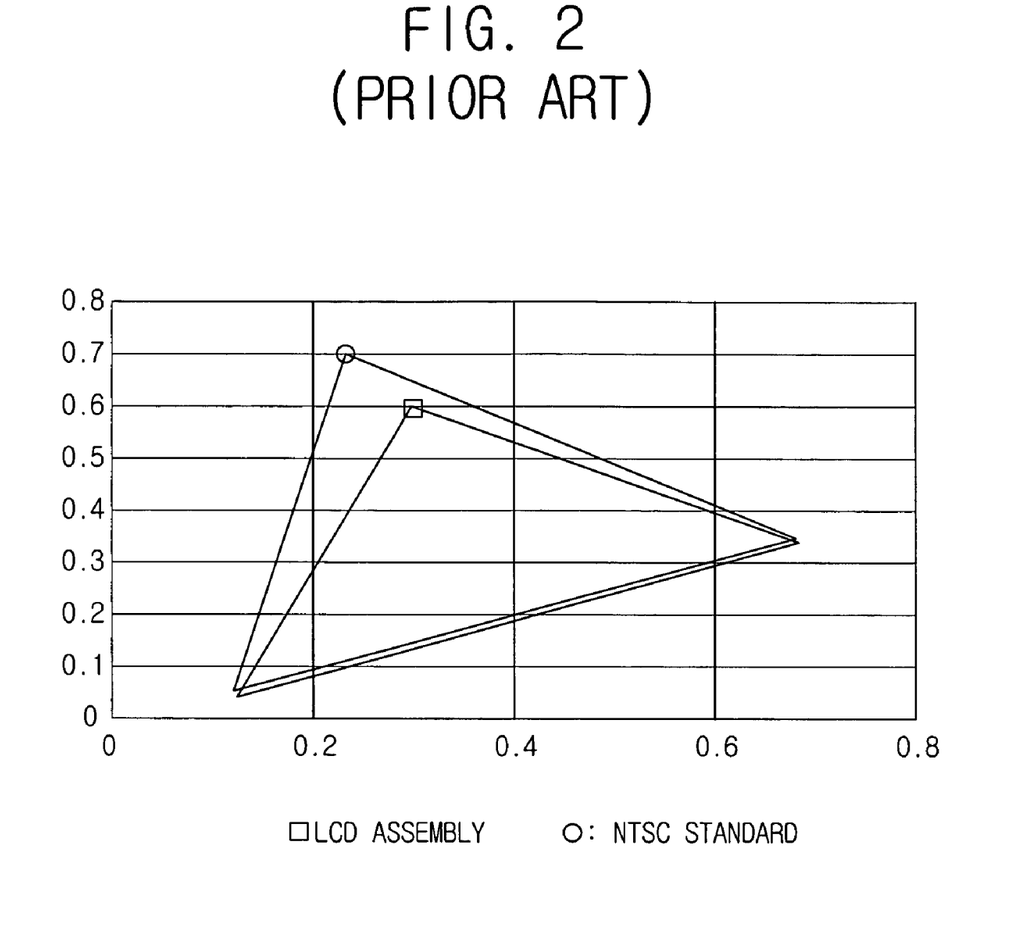
FIG. 2 is a graph illustrating a CIE chromaticity diagram of the conventional LCD assembly and an NTSC standard.

FIG. 2. illustrates a color reproduction of the conventional LCD assembly using the color photoresist and an American national television system committee (NTSC) standard in an international commission on illumination (CIE) system specified by CIE. Here, the CIE system shows a CIE chromaticity diagram based on three spectral stimulus values measured by a spectrophotometer, wherein three spectral stimulus values of stimulating the optic nerves with respect to red, green and blue colors are defined as X, Y and Z, respectively.

As shown in FIG. 2, the color reproduction of the conventional LCD assembly using the color photoresist meets the NTSC standard in red and blue regions of the CIE chromaticity diagram, but falls short of the NTSC standard in a green region because X and Y of the conventional LCD assembly are 0.25 and 0.60 and X and Y of the NTSC standard are 0.21 and 0.70.

Figure 3:
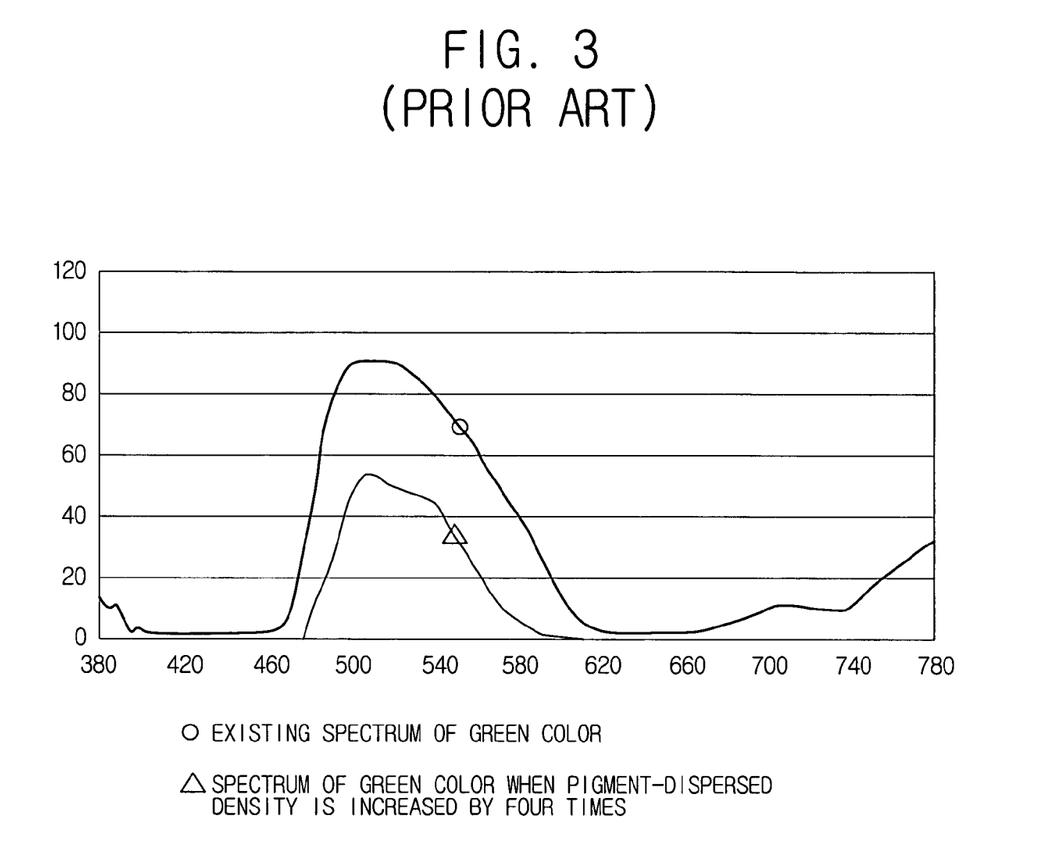
FIG. 3 is a graph illustrating light-transmissivity when pigment-dispersed density for a green color is increased by four times.

To meet the NTSC standard in the green region, there is needed a color filter thicker than the conventional color filter by four times. However, as shown in FIG. 3, if the pigment-dispersed density for the green color is increased by four times, the light-transmissivity is lowered and the process stability is decreased because of a low containing ratio of the binder and the dispersing agent in the process of fabricating the color filter.

SUMMARY OF THE INVENTION

Accordingly, it is an aspect of the present invention to provide an LCD assembly in which decrement of light-transmissivity is small, process stability is increased, and high chromaticity is realized.

Additional aspects and advantages of the invention will be set forth in part in the description which follows and, in part, will be obvious from the description, or may be learned by practice of the invention.

The foregoing and other aspects of the present invention are achieved by providing an LCD assembly comprising a TFT substrate, and a color filter disposed above the TFT substrate and formed with red, green and blue regions, further comprising an interference filter disposed corresponding to the green region with respect to a direction of emitting light to the color filter, and having a allowable wavelength range allowing light having a wavelength range of a green color to be transmitted.

According to an aspect of the invention, the interference filter is provided in an upper part or a lower part of the color filter.

According to an aspect of the invention, the interference filter is provided in an upper part or a lower part of the TFT substrate.

According to an aspect of the invention, the interference filter is made by selectively laminating a plurality of materials among $TiO_2$, $SiO_2$, ZnS, $MgF_2$, $CeF_2$ and $ZiO_2$.

According to an aspect of the invention, the allowable wavelength range of the interference filter has spectrum property of a wavelength range from 490 nm to 580 nm.

BRIEF DESCRIPTION OF THE DRAWINGS

These and other aspects and advantages of the present invention will become apparent and more readily appreciated from the following description of the embodiments, taken in conjunction with the accompany drawings of which.

DETAILED DESCRIPTION OF THE PREFERRED EMBODIMENT

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 4:
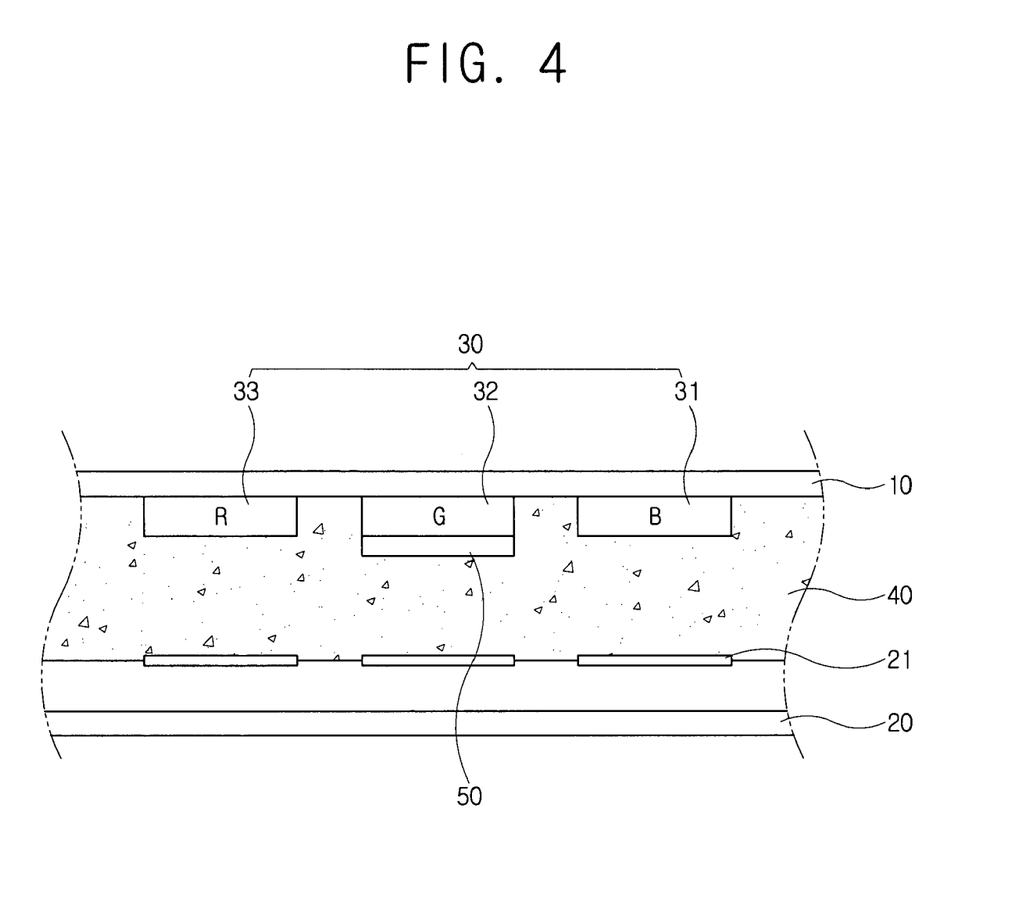
FIG. 4 is a sectional view of an LCD panel in an LCD assembly according to an first embodiment of the present invention.

FIG. 4 is a sectional view of an LCD assembly according to a first embodiment of the present invention. As shown therein, an LCD panel of the LCD assembly comprises a TFT substrate 20 having TFTs corresponding to a plurality of pixels, a color filter substrate 10 having the color filters 30, and a liquid crystal 40 filled between the TFT substrate 20 and the color filter substrate 10. Here, each pixel of the TFT substrate 20 is provided with an ITO 21 as an electrode. Further, a lower part of a green filter 32 among three color filters 31, 32 and 33 of the color filter 30 is provided with an interference filter 50. That is, the color filter 30 is formed by using an existing photoresist as an organic material, and then the interference filter 50 is added to only the green filter 32 of the color filter 30.

The interference filter 50 is a laminated thin film comprising materials different from each other in a refraction index, and filtrates light of a selected frequency band, that is, filtrates light of only a selected wavelength through selective reflection, using a light interference phenomenon generated on an interface of the thin film. At this time, a narrow wavelength of monochromatic light can be selected as a voluntarily wavelength.

Here, the interference filter 50 is made by laminating a plurality of materials among $TiO_2$, $SiO_2$, ZnS, $MgF_2$, $CeF_2$ and $ZiO_2$, wherein a lower part of the interference filter 50 is preferably one of $MgF_2$, $SiO_2$ and $CeF_2$ and an upper part thereof is preferably one of $TiO_2$, ZnS and $ZiO_2$. For example, in the case of a wavelength of 525 nm, the refraction indexes of $SiO_2$ and $TiO_2$ are respectively 1.46 and 2.33, so that $SiO_2$ and $TiO_2$ are respectively laminated in the lower and upper parts, thereby making the interference filter 50. Meanwhile, the thickness of the interference filter 50 and the number of the laminated materials are experimentally determined according to the selected wavelength.

With this configuration, the LCD assembly according to the present invention operates as follows.

The light emitted from a backlight (not shown) gets red, green and blue colors by passing through the LCD panel, and forms a picture by additively mixing three light colors. In the LCD assembly according to the present invention, spectral stimulus values related to color reproduction approximately meet the NTSC standard because the interference filter 50 is additionally provided to realize the green color among the three colors.

Figure 5:
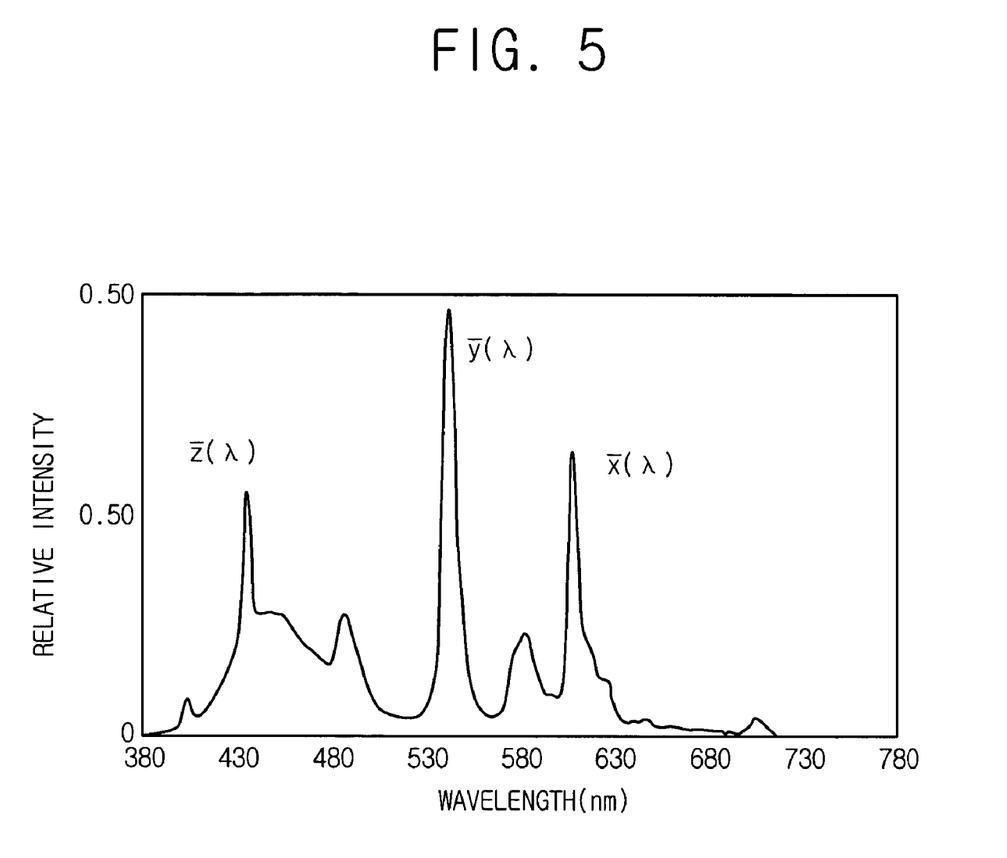
FIG. 5 is a graph illustrating color matching functions for determining spectral stimulus values.

In a CIE system, the spectral stimulus values X, Y and Z are derived from following equations.

$$X = \int_{880}^{780} S(\lambda)T(\lambda)\bar{x}(\lambda)d\lambda$$

$$Y = \int_{880}^{780} S(\lambda)T(\lambda)\bar{y}(\lambda)d\lambda$$

$$Z = \int_{880}^{780} S(\lambda)T(\lambda)\bar{z}(\lambda)d\lambda$$

Where $S(\lambda)$ is a spectrum of the light emitted from the backlight, $T(\lambda)$ is a spectrum of the light passed through the color filter 30, and $\bar{x}(\lambda)$, $\bar{y}(\lambda)$ and $\bar{z}(\lambda)$ are color matching functions shown in FIG. 5.

Further, in the CIE system, x, y and z are derived from following equations.

$$x = \frac{X}{X+Y+Z}$$

$$y = \frac{Y}{X+Y+Z}$$

$$z = \frac{Z}{X+Y+Z}$$

Here, $Z=1-x+y$, and therefore only x and y is enough to represent chromaticity property in the CIE system.

In the equations for calculating the spectral stimulus values, the light emitted from the same backlight has the same $S(\lambda)$; $\bar{x}(\lambda)$, $\bar{y}(\lambda)$ and $\bar{z}(\lambda)$ have constant values; and $T(\lambda)$ varies according to the color filters because it is a spectrum of the light passed through the color filter 30.

In the case of a green color displayed in the LCD assembly according to the present invention, the light emitted from the backlight passes through both the green filter 32 and the interference filter 50, so that light-transmissivity related to the spectrum of the green color is increased as compared with the conventional LCD assembly under the condition that the backlight having the same wavelength range is used, thereby changing X, Y and Z. Hence, according to the present invention, x and y in the CIE system are approximate to values required by the NTSC standard.

Thus, the LCD assembly according to the present invention prevents the light-trasmissivity from being decreased by a wavelength scattering phenomenon due to pigments included in the color filter 30, and increases the light-transmissivity without extending peak and intermediate wavelength ranges. That is, in the case of the green color, the green filter 32 and the interference filter 50 allows only the light having the wavelength of 490 nm~580 nm to be passed while effectively filtering the light having the other wavelength range.

Figure 6:
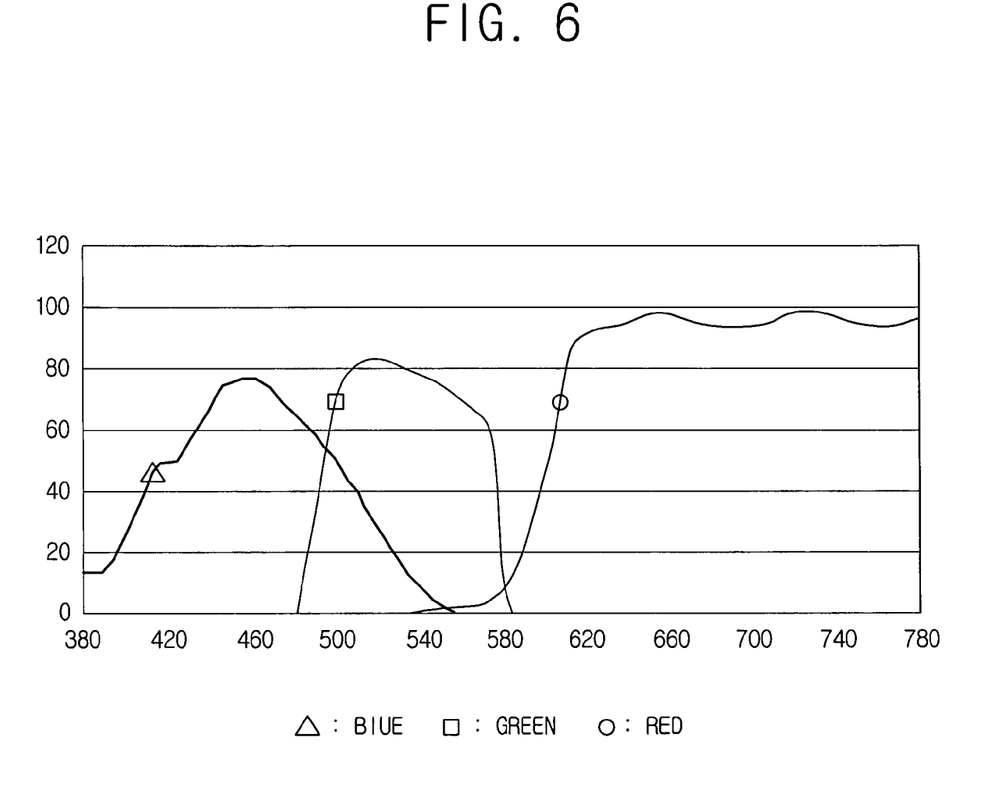
FIG. 6 illustrates light-transmissivity of the LCD assembly.

Further, FIG. 6 illustrates the light-transmissivity of each color according to the wavelength ranges. As shown therein, subtractive color mixing happens in the green filter 32 and interference filter 50 for the green color, thereby reducing decrement of the light-transmissivity and increasing its chroma.

Figure 7:
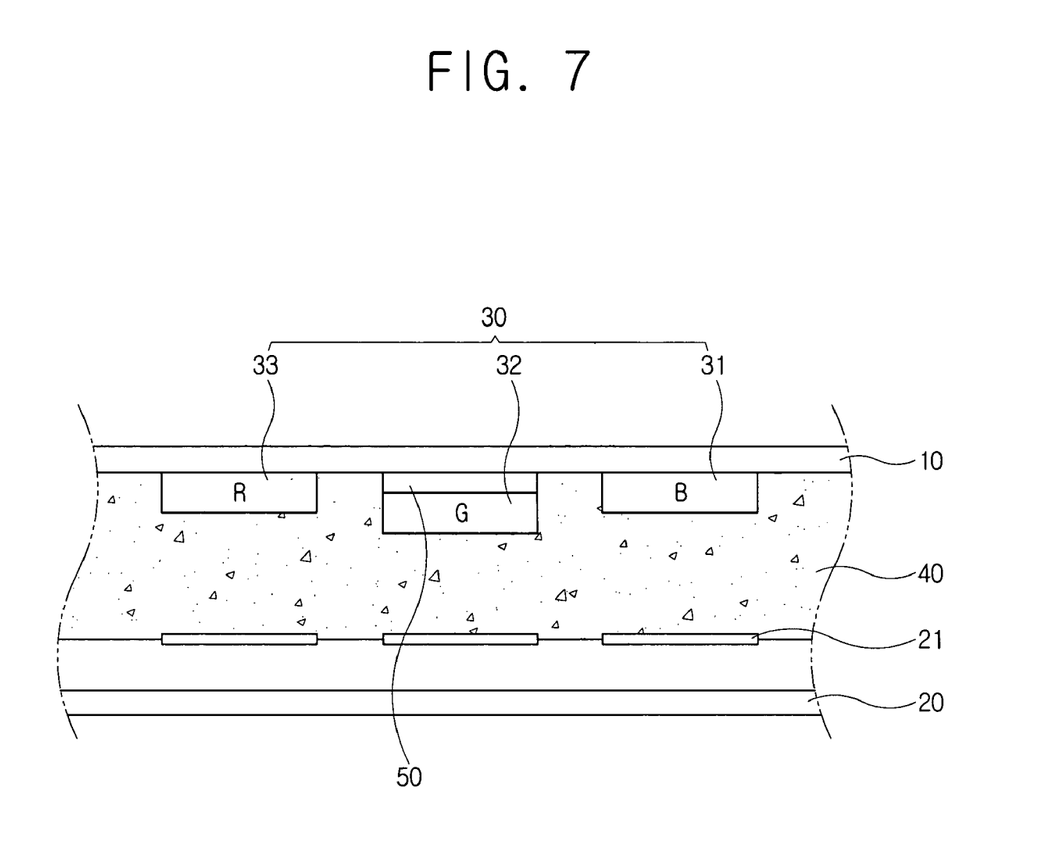
FIG. 7 is a sectional view of an LCD assembly according to a second embodiment of the present invention.

FIG. 7 is a sectional view of an LCD assembly according to a second embodiment of the present invention. In the first embodiment, the interference filter 50 is placed in a lower part of the green filter 32 of the color filter 30. However, in the second embodiment, an interference filter 50 is placed in an upper part of a green filter 32 of a color filter 30.

Figure 8:
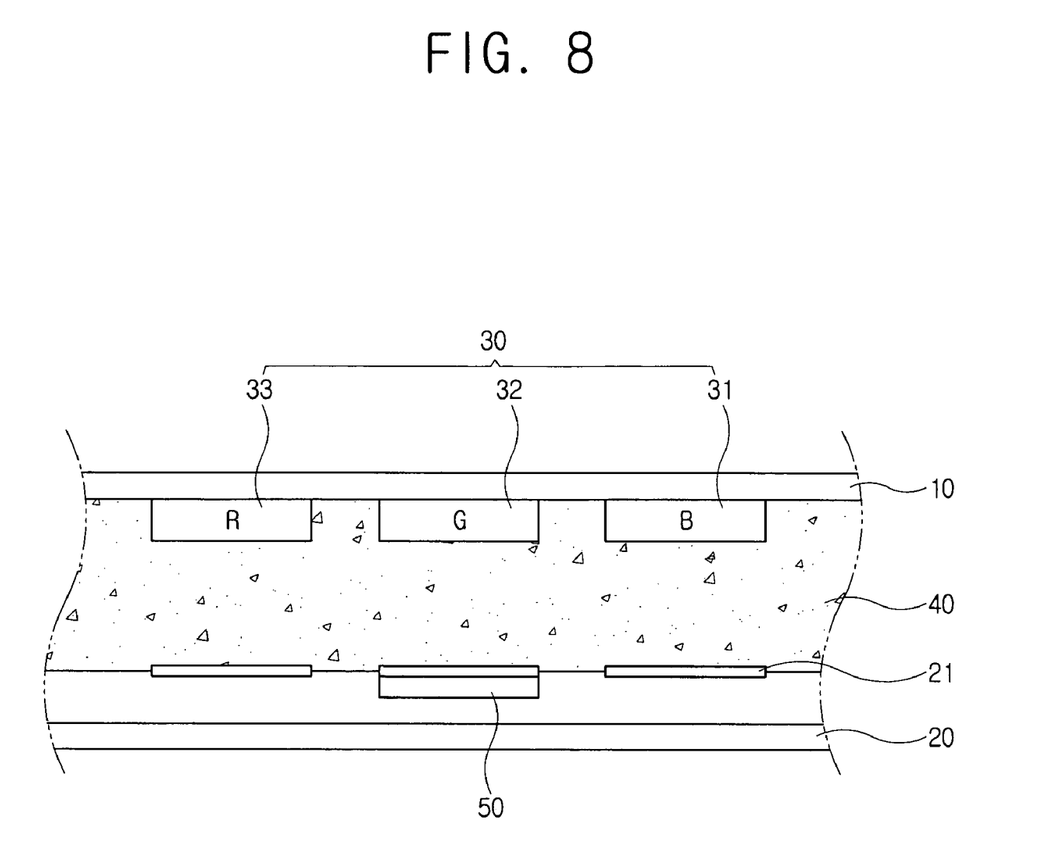
FIG. 8 is a sectional view of an LCD assembly according to a third embodiment of the present invention.
Figure 9:
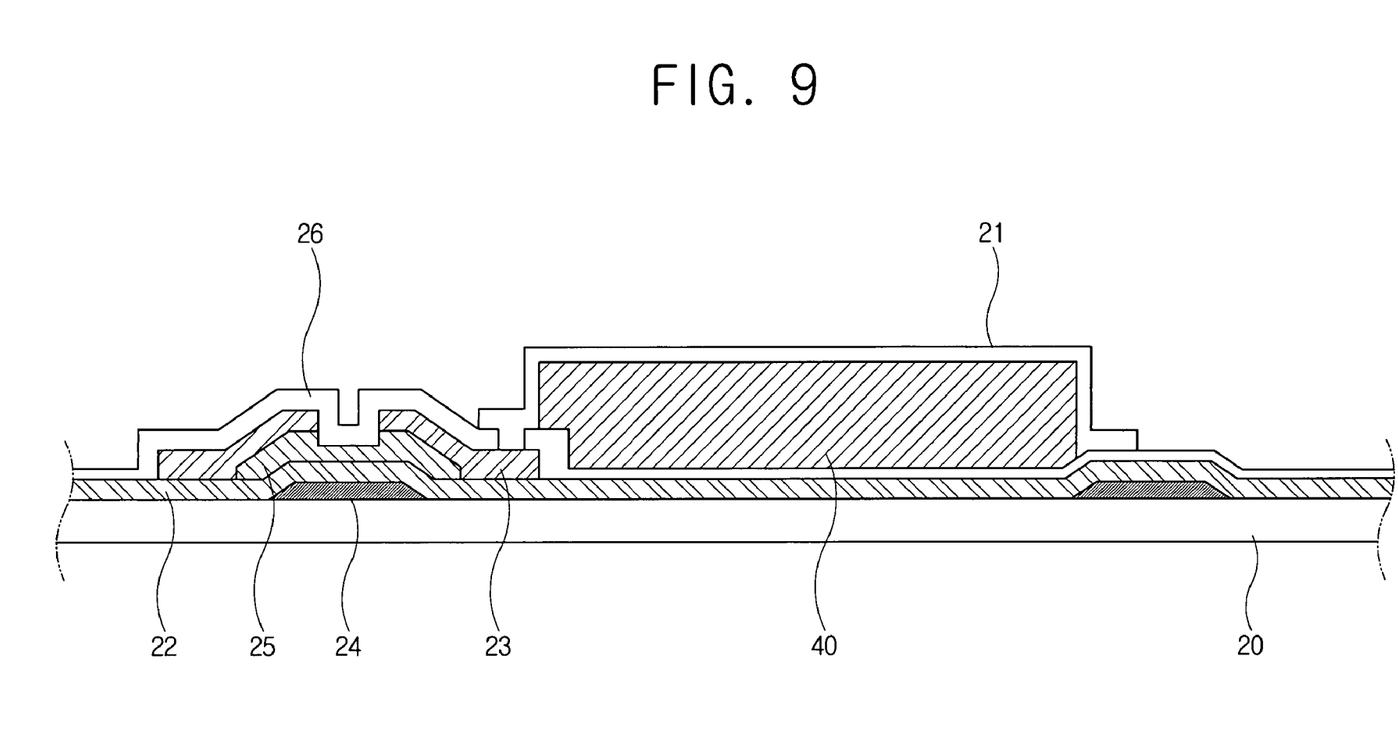
FIG. 9 is a sectional view of a TFT substrate in an LCD panel of FIG. 8.

FIG. 8 is a sectional view of an LCD assembly according to a third embodiment of the present invention, and FIG. 9 is a sectional view of a TFT substrate of FIG. 8. As shown therein, an interference filter 50 is interposed between a gate insulation film 22 and a pixel ITO film 21 on a TFT substrate 20. In FIG. 9, reference numerals 23, 24, 25 and 26 indicate a S/D line, a gate line, an active layer and a passivation film, respectively.

Figure 10:
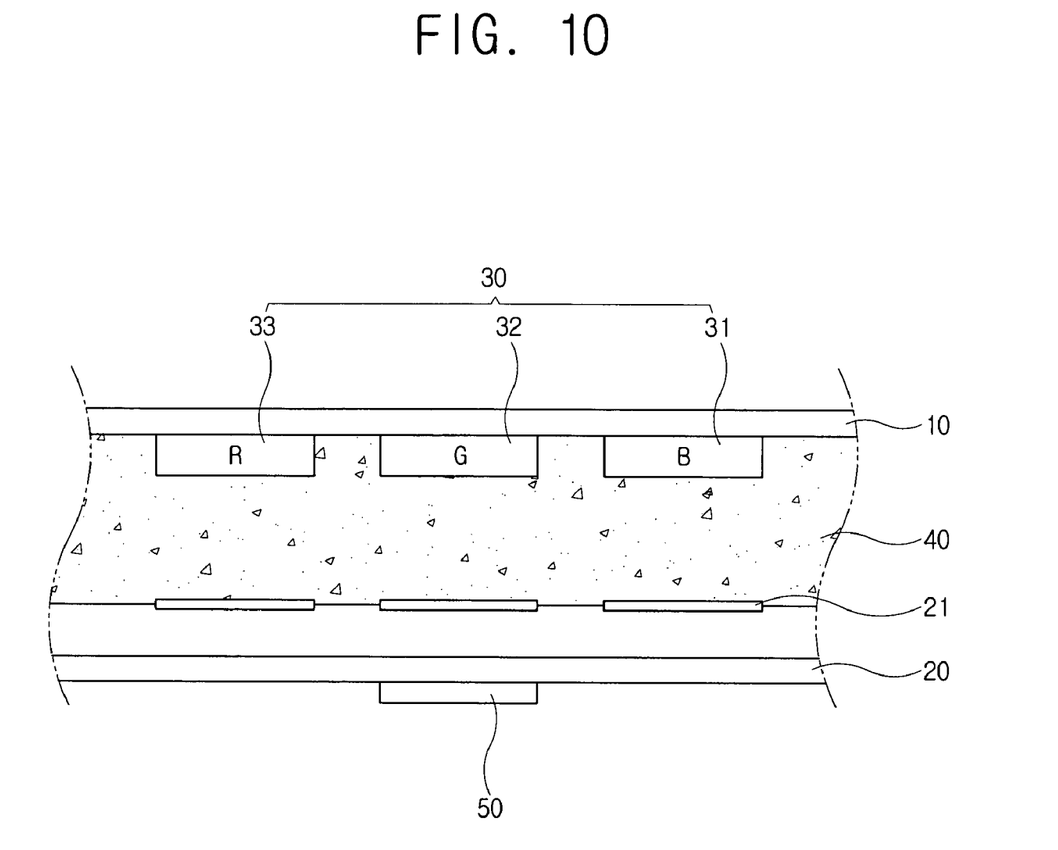
FIG. 10 is a sectional view of an LCD assembly according to a fourth embodiment of the present invention.

FIG. 10 is a sectional view of an LCD assembly according to a fourth embodiment of the present invention. As shown therein, the interference filter 50 is placed in a lower part of a TFT substrate 20.

As shown therein, the present invention provides an LCD assembly in which decrement of light-transmissivity is small, process stability is increased, and high chromaticity is realized.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. An LCD assembly comprising: a TFT substrate; a color filter disposed above the TFT substrate and formed with red, green and blue regions; and an interference filter disposed corresponding to the green region with respect to a direction of emitting light to the color filter, and having an allowable wavelength range allowing light having a wavelength range of a green color to be transmitted, wherein a cell gap between the green region of the color filter and the TFT substrate is smaller than a cell gap between the red and blue regions of the color filter and the TFT substrate, and wherein the interference filter is disposed on the color filter and the interference filter is not a color filter.

2. The LCD assembly according to claim 1, wherein the interference filter is disposed on an upper part or a lower part of the color filter.

3. The LCD assembly according to claim 1, wherein the interference filter is made by selectively laminating a plurality of materials among $TiO_2$, $SiO_2$, ZnS, $MgF_2$, $CeF_2$ and $ZiO_2$.

4. The LCD assembly according to claim 3, wherein the allowable wavelength range of the interference filter has spectrum property of a wavelength range from 490 nm to 580 nm.

5. The LCD assembly according to claim 2, wherein the interference filter is made by selectively laminating a plurality of materials among $TiO_2$, $SiO_2$, ZnS, $MgF_2$, $CeF_2$ and $ZiO_2$.

6. The LCD assembly according to claim 5, wherein the allowable wavelength range of the interference filter has spectrum property of a wavelength range from 490 nm to 580 nm.

7. An LCD assembly comprising a TFT substrate, and a color filter disposed above the TFT substrate and formed with red, green and blue regions, further comprising:
   an interference filter disposed corresponding exclusively to the green region with respect to a direction of emitting light to the color filter, and having an allowable wavelength range allowing light having a wavelength range of a green color to be transmitted,
   wherein no interference filter is disposed corresponding to the blue and red regions with respect to a direction of emitting light to the color filter.

* * * * *